United States Patent
Kang et al.

(10) Patent No.: US 8,359,600 B2
(45) Date of Patent: Jan. 22, 2013

(54) PROVIDING PERSONALIZATION OF VIRTUAL MACHINES FOR SYSTEM ON DEMAND (SOD) SERVICES BASED ON USER'S USE HABITS OF PERIPHERAL DEVICES

(75) Inventors: Dong-oh Kang, Daejeon (KR); Hyungjik Lee, Daejeon (KR); Miok Chae, Daejeon (KR); Yunkyung Park, Daejeon (KR); Jeunwoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 632 days.

(21) Appl. No.: 12/577,240

(22) Filed: Oct. 12, 2009

(65) Prior Publication Data

US 2010/0115511 A1    May 6, 2010

(30) Foreign Application Priority Data

Oct. 30, 2008  (KR) .................. 10-2008-0107352

(51) Int. Cl.
*G06F 9/46* (2006.01)
*G06F 3/00* (2006.01)
(52) U.S. Cl. ........................ 718/104; 710/15
(58) Field of Classification Search ............. None
See application file for complete search history.

(56) References Cited

U.S. PATENT DOCUMENTS

| | | | | |
|---|---|---|---|---|
| 5,548,722 A | * | 8/1996 | Jalalian et al. | 709/220 |
| 8,141,090 B1 | * | 3/2012 | Graupner et al. | 718/104 |
| 2005/0060704 A1 | * | 3/2005 | Bulson et al. | 718/1 |
| 2006/0155708 A1 | | 7/2006 | Brown et al. | |
| 2008/0163210 A1 | | 7/2008 | Bowman et al. | |

FOREIGN PATENT DOCUMENTS

KR    1020060108711 A    10/2006

\* cited by examiner

*Primary Examiner* — Meng An
*Assistant Examiner* — Wissam Rashid
(74) *Attorney, Agent, or Firm* — Ladas & Parry LLP

(57) ABSTRACT

Disclosed is a system for providing personalization of virtual machines for a system on demand (SoD) service includes an SoD server, wherein the SoD server includes an aspect measuring unit that measures user's use habits and aspects with respect to the peripheral devices on the basis of use or not of the peripheral devices; a preference generating unit that calculates preference for each attribute with respect to attributes included in the peripheral devices on the basis of the use habits and aspects measured by the aspect measuring unit; and a configuration unit that calculates satisfaction for each device with respect to peripheral devices which can be used in the virtual machine on the basis of the preference for each attribute calculated by the preference generating unit and configures the peripheral devices of the virtual machine on the basis of the calculated satisfaction for each device.

20 Claims, 6 Drawing Sheets

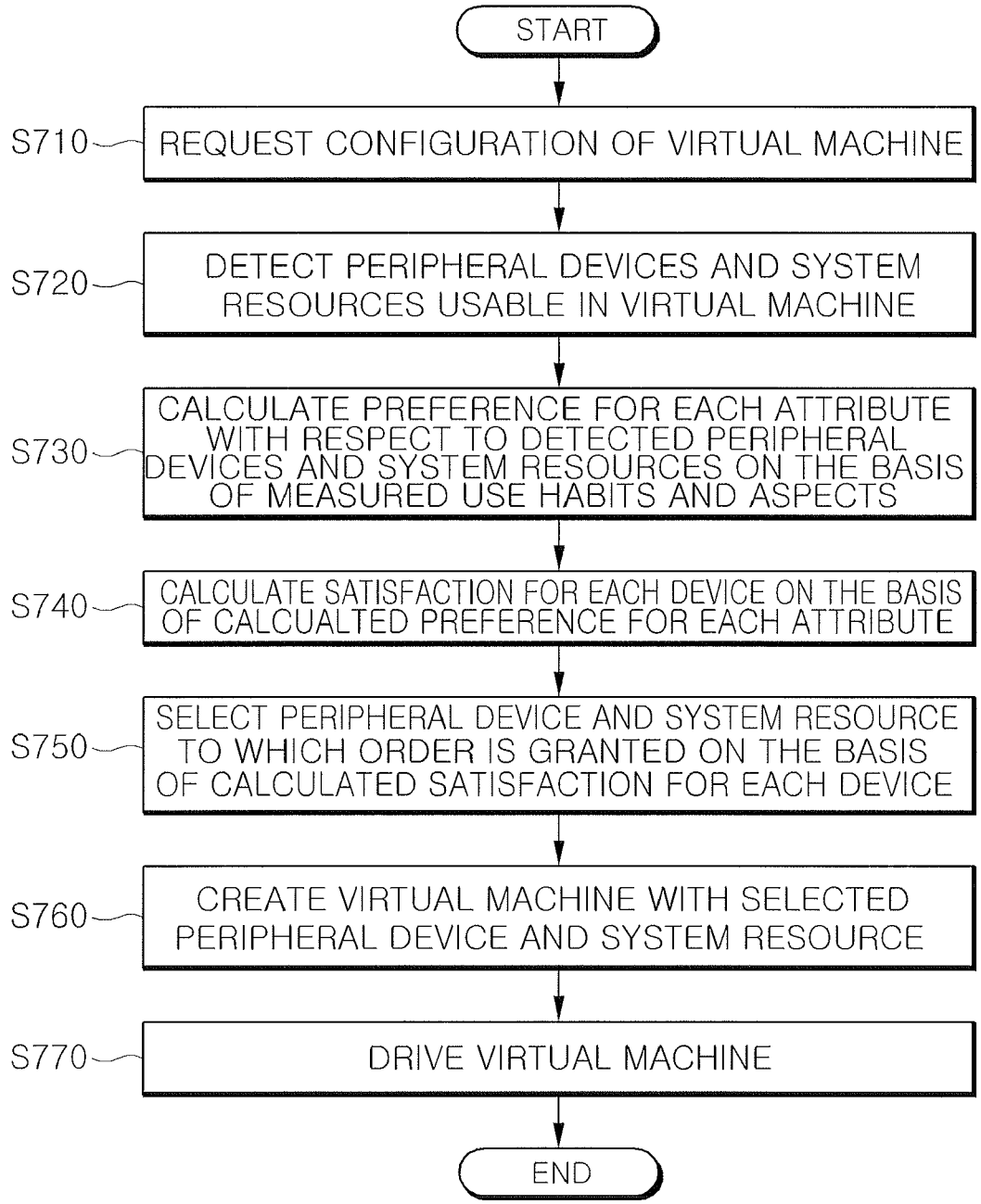

PROVIDING PERSONALIZATION OF VIRTUAL MACHINES FOR SYSTEM ON DEMAND (SOD) SERVICES BASED ON USER'S USE HABITS OF PERIPHERAL DEVICES

RELATED APPLICATIONS

The present application claims priority to Korean Patent Application Serial Number 10-2008-0107352, filed on Oct. 30, 2008, the entirety of which is hereby incorporated by reference.

BACKGROUND OF THE INVENTION

1. Field of the Invention

The present invention relates to a system and a method for providing personalization of virtual machines for a System on Demand (SoD) service, and more particularly, to a system and a method for providing personalization of virtual machines for a SoD service which is capable of optimally using resources by providing personalized virtual machines to users in the SoD service.

2. Description of the Related Art

Computing architecture widely used in the related art, as a client/server system, software must have been installed and executed for each of high-performance client computers installed under a known server and client network environment in order to use application software. In addition, a server just serves to connect a client to a network or store shared files or programs.

A server-based computing technology in which most of the jobs are performed in a server computer has been developed. The server-based computing technology is also referred to as a thin-client computing environment. An example of the system may include a 'terminal service' of the MS Corporation. In the server-based computing, the application program is executed in the server and the application program installed in the server can be accessed regardless of a client device through a terminal emulator in the client.

Therefore, all jobs which the users perform in a terminal corresponding to the client are performed in the server and the job result is displayed on a screen of a user's job terminal. Since all jobs currently performed in a personal computer (PC) are actually performed in the server, the PC needs not to be provided with storage devices such as a hard disk, a floppy disk, etc. unlike the known PC, thereby reducing the price of the terminal of the client.

Further, the server-based computing technology provides an environment in which multiusers can independently execute different application programs by accessing one server.

The terminal service is mounted on a server system based on Windows NT/2000/Net server OS of the MS corporation. An application program required for the server system is installed only once and the user executes an emulator which can access the terminal service in his/her own computer. The emulator executed in the user's computer accesses the server through the network to use the application program installed in the server system.

However, the known virtual system previously created and stores a virtual machine suitable for user's requirements in the server and provides the previously created virtual machine to a user who accesses the server by using remote access, etc. In this case, since the user feels inconvenience in use and it is difficult to grasp user's changed inclinations, a user-customized service configuring a user's desired system cannot achieve a desired effect.

In addition, in the known virtual system, in order to configure a virtual machine suitable for the user, the user selected constituent members of the virtual machine by himself/herself. At this time, the user must accurately designate the constituent members of the virtual machine in order to configure the virtual machine suitable for the user. However, this job is very inconvenient and complicated and more difficult in a ubiquitous computing environment with a plurality of network-connected wired/wireless I/O devices are provided.

Moreover, the known virtual system had a limit in supporting various wired/wireless I/O devices in the ubiquitous computing environment.

SUMMARY OF THE INVENTION

The present invention is contrived to solve the problems. There is an object of the present invention to provide a system and a method for providing personalization of virtual machines in a SoD service which is capable of calculating preference for each attribute by measuring and collecting user's virtual machine use habits and aspects and providing a virtual machine constituted by peripheral devices and system resources that are required for a user on the basis of the calculated preference.

In order to achieve the above-mentioned objects, a system for providing personalization of virtual machines for a SoD service according to an embodiment of the present invention includes: an SoD server, wherein the SoD server includes an aspect measuring unit that measures user's use habits and aspects with respect to the peripheral devices on the basis of use or not of the peripheral devices; a preference generating unit that calculates preference for each attribute with respect to attributes included in the peripheral devices on the basis of the use habits and aspects measured by the aspect measuring unit; and a configuration unit that calculates satisfaction for each device with respect to peripheral devices which can be used in the virtual machine on the basis of the preference for each attribute calculated by the preference generating unit and configures the peripheral devices of the virtual machine on the basis of the calculated satisfaction for each device.

The preference generating unit calculates the preference for each attribute by using the use habits and aspects measured by the aspect measuring unit at a predetermined set time interval.

The preference generating unit calculates the preference for each attribute by using the use habits and aspects accumulated and stored in the aspect measuring unit.

The configuration unit configures the virtual machine by using the peripheral device selected by the user terminal among the peripheral devices which can be used in the virtual machine.

The configuration unit configures the virtual machine by using the peripheral device having the highest satisfaction for each device among the peripheral devices which can be used in the virtual machine.

The SoD server further includes a management unit that detects the peripheral device which can be used in the virtual machine among the plurality of peripheral devices and transmits the detected peripheral device to the configuration unit and detects and transmits use or not of the peripheral device to the aspect measuring unit.

The SoD server further includes an interface unit that receives one of virtual machine creation modes including a manual creation mode, a semiautomatic creation mode, and an automatic creation mode from the user terminal.

The interface unit transmits the list of the peripheral devices which can be used in the virtual machine to the user terminal when the manual creation mode is inputted.

The interface unit transmits the list of the peripheral devices which can be used in the virtual machine to the user terminal, which are ordered on the basis of the satisfaction for each device calculated by the configuration unit when the semiautomatic creation mode is inputted.

The SoD server further includes a driving unit that connects and controls the peripheral devices of the virtual machines configured by the configuration unit.

In order to achieve the above-mentioned objects, a method for providing personalization of virtual machines for a SoD service according to an embodiment of the present invention includes: allowing an aspect measuring unit to measure user's use habits and aspects with respect to the peripheral devices on the basis of use or not of the peripheral devices; allowing a preference generating unit to calculate preference for each attribute with respect to attributes included in the peripheral devices on the basis of the use habits and aspects measured by the aspect measuring unit; allowing a configuration unit to calculate satisfaction for each device with respect to peripheral devices which can be used in the virtual machine on the basis of the preference for each attribute calculated by the preference generating unit; and allowing the configuration unit to configure the peripheral devices of the virtual machine on the basis of the calculated satisfaction for each device.

In calculating the preference, the preference generating unit calculates the preference for each attribute by using the use habits and aspects measured by the aspect measuring unit at a predetermined set time interval.

In calculating the preference, the preference generating unit calculates the preference for each attribute by using the use habits and aspects accumulated and stored in measuring the user's use habits and aspects.

In the configuring the peripheral devices, the configuration unit configures the virtual machine by using the peripheral device selected by the user terminal among the peripheral devices which can be used in the virtual machine.

In the configuring the peripheral devices, the configuration unit configures the virtual machine by using the peripheral device having the highest satisfaction for each device among the peripheral devices which can be used in the virtual machine.

The method for providing personalization of virtual machines for a SoD service further includes: allowing a management unit to detect the peripheral device which can be used in the virtual machine among a plurality of peripheral devices; and allowing the management unit to detect use or not of the peripheral device constituting the virtual machine.

The method for providing personalization of virtual machines for a SoD service further includes: allowing an interface unit to receive any one of virtual machine creation modes including a manual creation mode, a semiautomatic creation mode, and an automatic creation mode from the user terminal.

In inputting any one virtual machine creation mode, when the manual creation mode is inputted, the interface unit transmits the list of the peripheral devices which can be used in the virtual machine to the user terminal.

In inputting any one virtual machine creation mode, the interface unit transmits the list of the peripheral devices which can be used in the virtual machine, which are ordered on the basis of the satisfaction for each device calculated in calculating the satisfaction to the user terminal when the semiautomatic creation mode is inputted.

The method for providing personalization of virtual machines for a SoD service further includes: allowing a driving unit to connect and control the peripheral devices of the virtual machines configured by the configuration unit.

According to an embodiment of the present invention, a system and a method for providing personalization of virtual machines in a SoD service can conveniently provide a virtual machine suitable for user's requirements without user's directly designating complicated constituent members of the virtual machines of the SoD system by calculating preference for each attribute by measuring and collecting user's virtual machine use habits and aspects and providing a virtual machine constituted by peripheral devices and system resources that are required for a user on the basis of the calculated preference.

Further, the system and the method for providing personalization of virtual machines in a SoD service can use more optimized peripheral devices and system resources for the SoD service by creating and providing the virtual machine with only peripheral devices and system resources required for a user.

BRIEF DESCRIPTION OF THE DRAWINGS

FIG. 7 is a flowchart for illustrating a step of creating virtual machines in an automatic creation mode of FIG. 4.

DETAILED DESCRIPTION OF THE PREFERRED EMBODIMENTS

Figure 1:
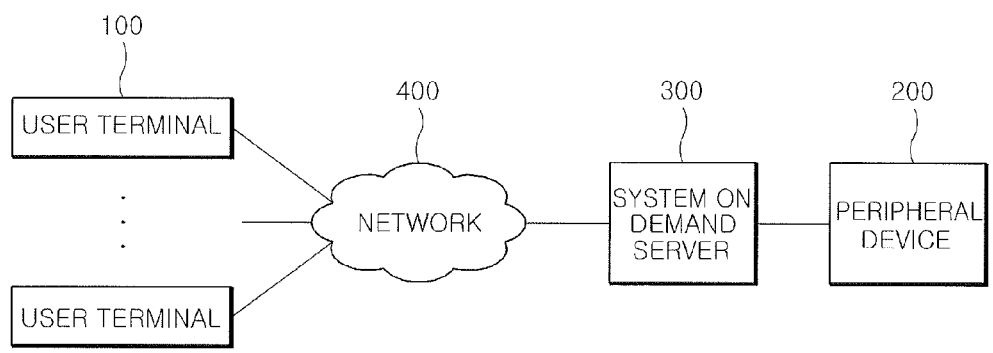
FIG. 1 is a block diagram for illustrating a configuration of a system for providing personalization of virtual machines for a SoD service according to an embodiment of the present invention.

Hereinafter, the most preferred embodiments of the present invention will be described with reference to the accompanying drawings for detailed description so that the spirit of the present invention can easily be performed by those skilled in the art. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention.

Figure 2:
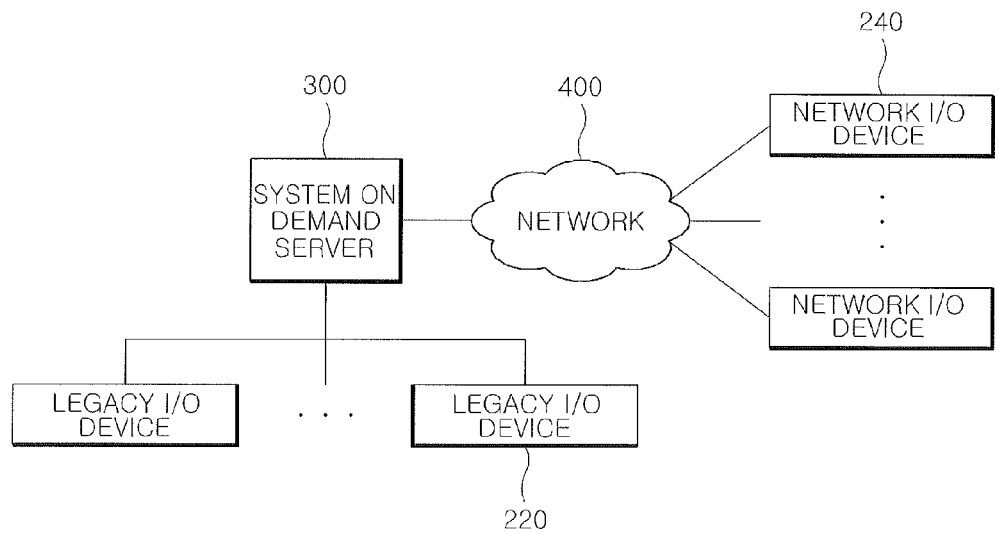
FIG. 2 is a block diagram for illustrating peripheral devices of FIG. 1.

Hereinafter, a system for providing personalization of virtual machines for a SoD service according to an embodiment of the present invention will be described in detail with reference to the accompanying drawings. FIG. 1 is a block diagram for illustrating a configuration of a system for providing personalization of virtual machines for a SoD service according to an embodiment of the present invention and FIG. 2 is a block diagram for illustrating a configuration of peripheral devices of FIG. 1.

As shown in FIG. 1, the system for providing personalization of virtual machines for an SoD service includes a user terminal 100, an SoD server 300, and a peripheral device 200 in a ubiquitous computing environment.

The user terminal 100 is connected to the SoD server 300 through a network 400. The user terminal 100 receives and uses a personalized virtual machine from the SoD server 300. The user terminal 100 receives a virtual machine creation mode, and the peripheral device 200 and system resources to be used in the virtual machine from a user and transmits them to the SoD server 300 on the request of the SoD server 300. Herein, the user terminal 100 can be connected to the SoD server 300 through the network 400 and terminals such as a desktop computer, a notebook, a UMPC, etc. that can use the virtual machine provided from the SoD server 300 are used as the user terminal 100.

The peripheral device 200 is constituted by a plurality of I/O devices, a monitor, a printer, a speaker, a keyboard, a mouse, etc. that are used in the virtual machine provided to the user through the user terminal 100. As shown in FIG. 2, the peripheral device 200 includes a legacy I/O device 220 and a network I/O device 240. The legacy I/O device 220 are directly connected to I/O ports of the SoD server 300 and the network I/O device 240 is connected to the SoD server 300 on the basis of a wired/wireless network protocol. Herein, the wired/wireless network protocol may be connection protocols such as IP, Bluetooth, zigbee, etc. and after each device is connected to the network 400, each device transmits information on each device to the SoD server 300.

The SoD server 300, which is connected to a plurality of user terminals 100 and a plurality of peripheral devices 200, measures user's use habits and use aspects for the peripheral device 200 and the system resources used to configure the virtual machine, calculates preference for each attribute with respect to the plurality of peripheral devices 200 and the system resources on the basis of the measured use habits and use aspects, create the virtual machine on the basis of satisfaction for each device, which is calculated by using the preference for each calculated attribute, and provides the created virtual machine to the user terminal 100.

The SoD server 300, which is connected to the plurality of peripheral devices 200 through the I/O ports or the network 400, can determine whether or not the peripheral devices are provided in a plug-and-play scheme with respect to the peripheral devices 200, calculate information on each peripheral device 200, and control each peripheral device 200.

The SoD server 300 has the system resources including a memory, a hard disk, a CPU, etc., and allocates and uses the system resources as a resource of the virtual machine. The SoD server 300 creates and provides the virtual machine to which the peripheral devices 200 and the system resources are allocated on a user's request through the user terminal 100. Herein, the SoD server 300 creates the virtual machine in three modes of a manual creation mode, a semiautomatic creation mode, and an automatic depending on the virtual machine creation mode inputted from the user terminal 100. In the manual creation mode, the user creates the virtual machine by designating a desired peripheral device 200 and a desire system resource among the lists of the peripheral devices 200 and the system resources which can be used in the virtual machine by using an interface unit 310. In the semiautomatic creation mode, when the SoD server 300 displays the lists of the peripheral devices 200 and the system resources which can be used in the virtual machine to the user through the interface unit 310, the SoD server 300 displays the peripheral devices 200 and the system resources in the order of high satisfaction in link with the satisfaction for each device, which is calculated on the basis of the preference for each attribute and the user creates the virtual machine by designating the desired peripheral device 200 and the desired system resource. In the automatic creation mode, the SoD server 300 creates the virtual machine that uses the peripheral device 200 and the system resource which are most suitable for the user without user's selection. Herein, even in the automatic creation mode, when the user wants to change the configuration of the virtual machine, the peripheral device 200 and the system resource can be changed in the same manner as the semiautomatic creation mode.

Figure 3:
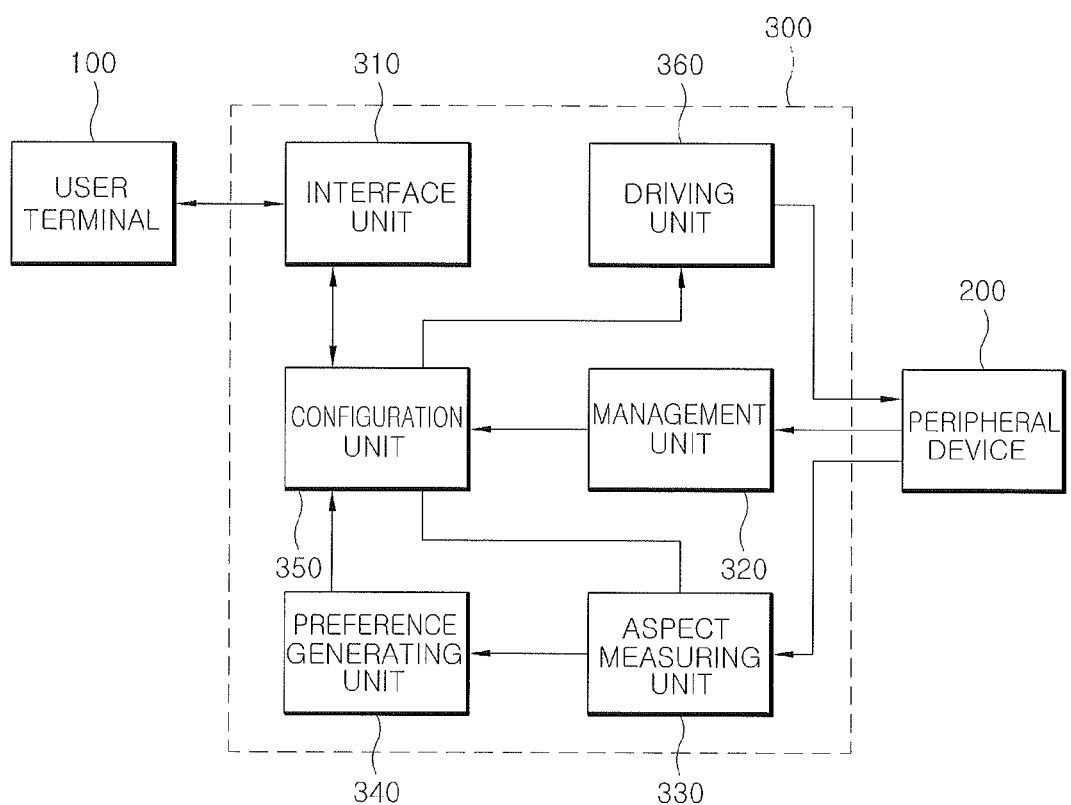
FIG. 3 is a block diagram for illustrating a configuration of an SoD server of FIG. 1.

Hereinafter, an SoD server of a system for providing personalization of virtual machines for a SoD service according to an embodiment of the present invention will be described in detail with reference to the accompanying drawings. FIG. 3 is a block diagram for illustrating a configuration of an SoD server of FIG. 1.

As shown in FIG. 3, the SoD server 300 includes the interface unit 310, a management unit 320, an aspect measuring unit 330, a preference generating unit 340, a configuration unit 350, and a driving unit 360.

The interface unit 310 receives user log-in information from the user terminal 100. That is, the interface unit 310 receives the log-in information including an ID, a password, etc. of a user who desires to use a personalization service of the virtual machine through the user terminal 100.

The interface unit 310 receives the virtual machine creation mode from the user terminal 100. That is, the interface unit 310 receives any one of the virtual machine creation modes including the manual creation mode, the semiautomatic creation mode, and the automatic creation mode. Herein, when the interface unit 310 receives the manual creation mode of the virtual machine from the user terminal 100, the interface unit 310 transmits the lists of the peripheral devices 200 and the system resources which can be used in the virtual machine, which are detected in the management unit 320 to the user terminal 100. When the interface unit 310 receives the semiautomatic creation mode, the interface unit 310 transmits the lists of the peripheral devices 200 and the system resources which can be used in the virtual machine, to which the order is granted on the basis of the satisfaction for each device, which is calculated in the configuration unit 350 to the user terminal 100.

The interface unit 310 receives configuration information of the virtual machine from the user terminal 100. That is, when the preference for each attribute is not sufficiently grasped like early use of the SoD service or the manual creation mode or the semiautomatic creation mode of the virtual machine is selected on the user's request, the interface unit 310 receives the peripheral device 200 and the system resource which will configure the virtual machine from the user terminal 100.

The interface unit 310 receives information from the user terminal 100 by a web portal through a web server. Herein, the interface unit 310 may directly receive the information from the user through the monitor, keyboard, and mouse that are connected to the I/O ports. In this case, the user terminal 100 may be omitted from the configuration.

The management unit 320 detects the peripheral device 20 and the system resource which can be used in the virtual machine among the plurality of peripheral device 200 and the system resources. That is, the management unit 320 manages information on wired/wireless I/O devices and resources of the SoD server 300, which are currently usable. The management unit 320 detects the peripheral device 200 including the legacy I/O device 220 and the network I/O device 240, and system resources including a usable memory, a disk capacity, the number of CPUs, software disk images, etc. Herein, the management unit 320 may store the preference for each attribute with respect to each peripheral device 200 and system resource.

The management unit 320 detects whether or not the peripheral devices 200 and the system resources constituting the virtual machine are used. The management unit 320 transmits the detected use or not of the peripheral devices 200 and the system resources to the aspect measuring unit 330. Herein, whether or not the peripheral devices 200 and the system resources are used is the basis of measuring the user's habits and aspects.

The aspect measuring unit 330 measures the user's use habits and aspects for the peripheral devices 200 and the system resources on the basis of use or not of the peripheral device 200 and the system resource, which is detected in the management unit 320, and accumulates and stores the user's use habits and aspects. That is, the aspect measuring unit 330 measures the user's use habits and aspects for the peripheral device 200 and the system resource which configure the virtual machine by receiving use or not of the peripheral device 200 and the system resource which are constituent members of the virtual machine from the management unit 320 in an event form. For example, the aspect measuring unit 330 measures a user's predetermined monitor use time, duration, frequency, or the like on the basis of use or not of the monitor used as the constituent member of the virtual machine in the management unit 320.

The preference generating unit 340 calculates the preference for each attribute with respect to the peripheral device 200 and the system resource on the basis of the use habits and aspects, which are measured in the aspect measuring unit 330. That is, the preference generating unit 340 calculates the preference for each attribute with respect to the attributes of the peripheral device 200 and the system resource which configure the virtual machine on the basis of the user's use habits measured in the aspect measuring unit 330. At this time, the peripheral device 200 and the system resource which configure the virtual machine have various attributes and if the user frequently uses a predetermined constituent member for a long time, the preference for each attribute among attributes of the constituent member is increased. For example, if the user uses an optical mouse more frequently than a ball mouse, the preference for each attribute of an attribute of the optical mouse among attributes of the mouse is increased.

The preference generating unit 340 independently calculates preference for each attribute regardless of a time and preference for each attribute dependent on the time with respect to the peripheral device 200 and the system resource which configure the virtual machine. That is, the preference generating unit 340 calculates the preference for each attribute by using use habits and aspects measured by the aspect measuring unit 330 at a predetermined set time interval or the preference for each attribute by using use habits and aspects which are accumulated and stored in the aspect measuring unit 330. Accordingly, the preference for each attribute regardless of the time among the preferences for each attribute calculated by the preference generating unit 340 is user's overall preference for each attribute and the preference for each attribute dependent on the time is preference for each attribute at a predetermined time. A function of the preference for each attribute dependent on the time has a time as an independent variable. For example, the preference generating unit 340 calculates the preference for each attribute dependent on the time on the basis of user's use aspects of the constituent members of the virtual machine, which are measured every 30 minutes or calculates the preference for each attribute regardless of the use habits and aspects on the basis of use habits and aspects which are accumulated and stored in the aspect measuring unit 330, such as an accumulated use duration, an accumulated use frequency, etc.

The preference generating unit 340 calculates the preference for each attribute with respect to the peripheral device 200 and the system resource, which are detected in the management unit 320 on the basis of the use habits and aspects measured by the aspect measuring unit 330. For example, the key board which is one of the peripheral devices 200 has attributes such as an operation type, the number of keys, etc. and the preference generating unit 340 calculates the preference for each attribute.

The configuration unit 350 configures the virtual machine on the basis of the virtual machine creation mode (i.e., manual creation mode, semiautomatic creation mode, and automatic creation mode) inputted through the interface unit 310. Herein, the configuration unit 350 calculates the satisfaction for each device with respect to the peripheral device 200 and the system resource detected in the management unit 320 on the basis of the preference for each attribute calculated by the preference generating unit 340 and configures the peripheral device 200 and the system resource of the virtual machine on the basis of the calculated satisfaction for each device. That is, when the manual creation mode or the semiautomatic creation mode is inputted, the configuration unit 350 configures the virtual machine with the peripheral device 200 and the system resource selected by the user terminal 100 among the lists of the peripheral devices 200 and the system resources provided to the user terminal 100 and when the automatic creation mode is inputted, the configuration unit 350 configures the virtual machine with the peripheral device 200 and the system resource having the maximum satisfaction for each device.

The driving unit 360 connects and controls the peripheral device 200 of the virtual machine configured in the configuration unit 350, and allocates and provides the system resource of the configured virtual machine to the user terminal 100. That is, the driving unit 360 drives the virtual machine by allocating the system resources (i.e., memory, disk capacity, the number of CPUs, software disk images, etc.) of the SoD server 300 with respect to the configuration of the virtual machine configured in the configuration unit 350, and connecting and controlling the peripheral device 200 (i.e., monitor, printer, speaker, keyboard, mouse, etc.) to provide a customized virtual machine to the user.

Hereinafter, a method for providing personalization of virtual machines for a SoD service according to an embodiment of the present invention will be described in detail with reference to the accompanying drawings.

Figure 4:
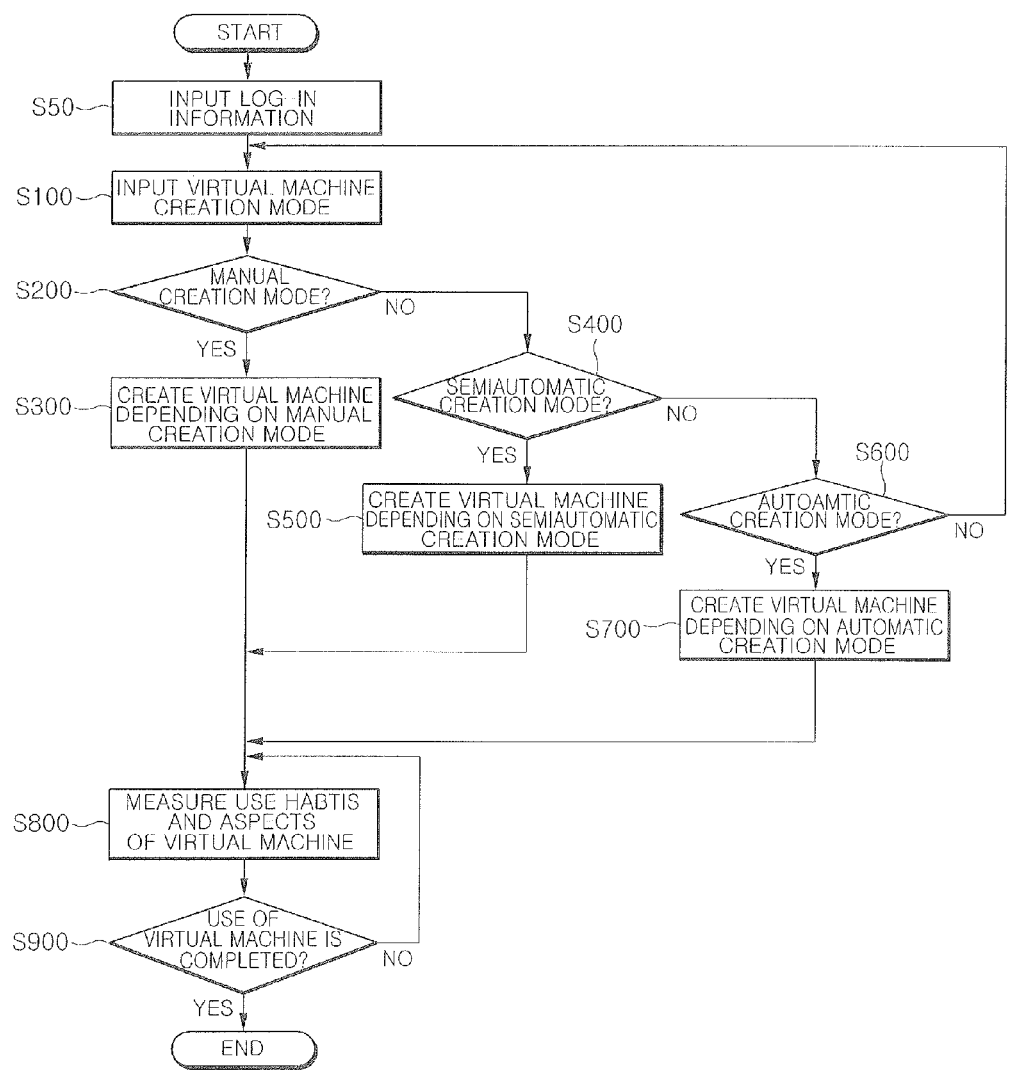
FIG. 4 is a flowchart for illustrating a method for providing personalization of virtual machines for a SoD service according to an embodiment of the present invention.

FIG. 4 is a flowchart for illustrating a method for providing personalization of virtual machines for a SoD service according to an embodiment of the present invention.

As a user who wants to use a personalized virtual machine accesses an SoD server 300 through a network 400 by using a user terminal 100, an interface unit 310 requests the user terminal 100 to input user's log-in information (S50). When the user receives the request for input of the log-in information, the user inputs the log-in information including an ID, and a password by using the user terminal 100. The user terminal 100 transmits the inputted log-in information to the interface unit 310 through the network 400.

Next, when user authentication using the log-in information inputted from the user terminal 100 is completed, the interface unit 310 requests the user terminal 100 to input a virtual machine creation mode (S100). As the user receives the request for input of the virtual machine creation mode, the user inputs any one of the virtual machine creation modes including a manual creation mode, a semiautomatic creation mode, and an automatic creation mode by using the user terminal 100. The user terminal 100 transmits the inputted virtual machine creation mode to the interface unit 310 through the network 400.

When the manual creation mode is inputted from the user terminal 100 (S200; YES), the interface unit 310 requests the configuration unit 350 to create the virtual machine by the manual creation mode (S300). The configuration unit 350 provides the lists of peripheral devices 200 and system resources which can be used in the virtual machine by using the interface unit 310 when the creation of the virtual machine by the manual creation mode is requested from the interface unit 310, creates the virtual machine by using the peripheral device 200 and the system resource selected by the user among the provided lists, and provides the virtual machine created through the user terminal 100 to the user.

When the semiautomatic creation mode is inputted from the user terminal 100 (S400; YES), the interface unit 310 requests the configuration unit 350 to create the virtual machine by the semiautomatic creation mode (S500). As the creation of the virtual machine by the semiautomatic creation mode is requested from the interface unit 310, the configuration unit 350 displays the peripheral devices 200 and the system resources in the order of high preference for each attribute in link with preference for each attribute when displaying the lists of peripheral devices 200 and system resources which can be used in the virtual machine by using the interface unit 310, creates the virtual machine by using the peripheral device 200 and the system resource selected by the user, and provides the virtual machine created through the user terminal 100 to the user.

When the automatic creation mode is inputted from the user terminal 100 (S600; YES), the interface unit 310 requests the configuration unit 350 to create the virtual machine by the automatic creation mode to the configuration unit 350 (S700). The configuration unit 350 creates the virtual machine by using the peripheral device 200 and the system resource having the maximum satisfaction for each device as the creation of the virtual machine is requested by the automatic creation mode from the interface unit 310 and provides the virtual machine created through the user terminal 100 to the user.

An aspect measuring unit 330 measures use habits and aspects of the virtual machine as the created virtual machine is driven (S800). That is, the aspect measuring unit 330 measures the user's use habits and aspects including a user's using time, duration, frequency, etc. for the peripheral devices 200 and the system resources on the basis of use or not of the peripheral device 200 and the system resource which are used in the virtual machine.

Herein, the aspect measuring unit 330 measures the use habits and aspects at a predetermined set time interval (i.e., every 30 minutes) until use of the virtual machine is terminated or measures the use habits and aspects whenever the peripheral device 200 and the system resource of the virtual machine are used, and accumulates and stores the use habits and aspects (S900).

Figure 5:
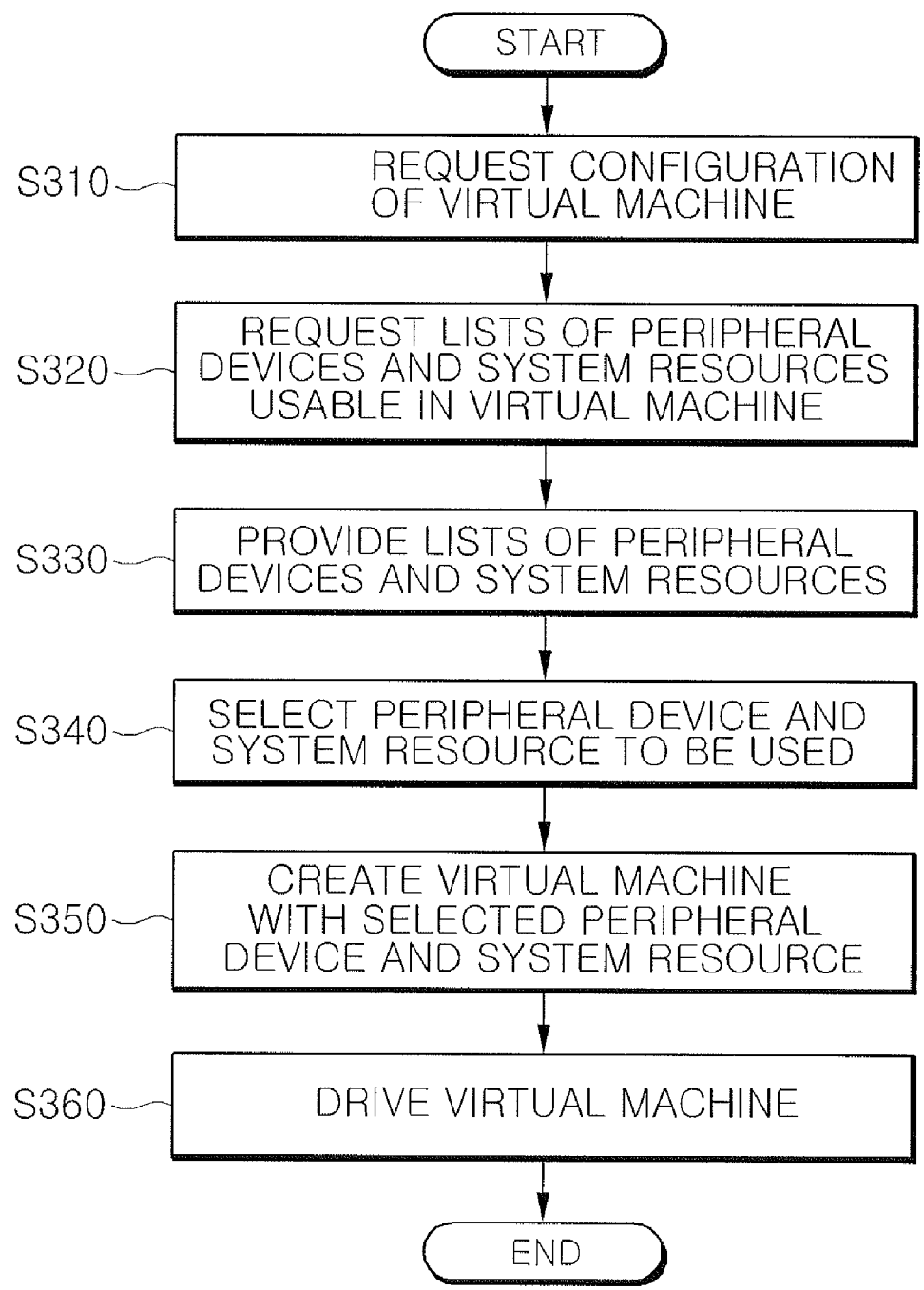
FIG. 5 is a flowchart for illustrating a step of creating virtual machines in a manual creation mode of FIG. 4.

FIG. 5 is a flowchart for illustrating a step of creating virtual machines in a manual creation mode of FIG. 4.

First, when the interface unit 310 receives the manual creation mode as the virtual machine creation mode from the user terminal 100, the interface unit 310 requests the configuration unit 350 to configure the virtual machine by the manual creation mode (S310).

When the configuration unit 350 receives the request for the configuration of the virtual machine by the manual creation mode from the interface unit 310, the configuration unit 350 requests the lists of the peripheral devices 200 and the system resources which can be used in the virtual machine to a management unit 320 (S320). The management unit 320 detects the peripheral device 200 and the system resource which can currently be used in the virtual machine among a plurality of peripheral devices 200 and the system resources on a detection request of the configuration unit 350 and transmits the detected peripheral device 200 and system resource to the configuration unit 350.

The configuration unit 350 provides the lists of the peripheral devices 200 and the system resources which are received from the management unit 320 to the user terminal 100 through the interface unit 310 (S330). For example, when the configuration unit 350 receives a keyboard 1, a keyboard 2, and a keyboard 3 as the lists of the peripheral device 200 and the system resources from the management unit 320, the configuration unit 350 provides the keyboard 1, the keyboard 2, and the keyboard 3 in accordance with the order of the lists regardless of satisfaction for each device of the keyboards to the user terminal 100.

As the lists of the peripheral devices 200 and the system resources are received, the user selects the peripheral device 200 and the system resource to be used in the virtual machine among the lists of the peripheral devices 200 and the system resources by operating the user terminal 100 and transmits the selected peripheral device 200 and system resource to the interface unit 310 (S340).

The interface unit 310 requests the configuration unit 350 to create the virtual machine using the peripheral device 200 and the system resource that are received from the user terminal 100 and the configuration unit 350 creates the virtual machine constituted by the peripheral device 200 and the system resource that are selected by the user on the request of the interface unit 310 (S350).

The configuration unit 350 transmits a request for driving the peripheral device 200 and the system resource of the created virtual machine to the driving unit 360. The driving unit 360 drives the virtual machine by allocating the system resource constituting the virtual machine, and connecting and controlling the peripheral device 200 on the driving request of the configuration unit 350 to provide the virtual machine (S360).

Figure 6:
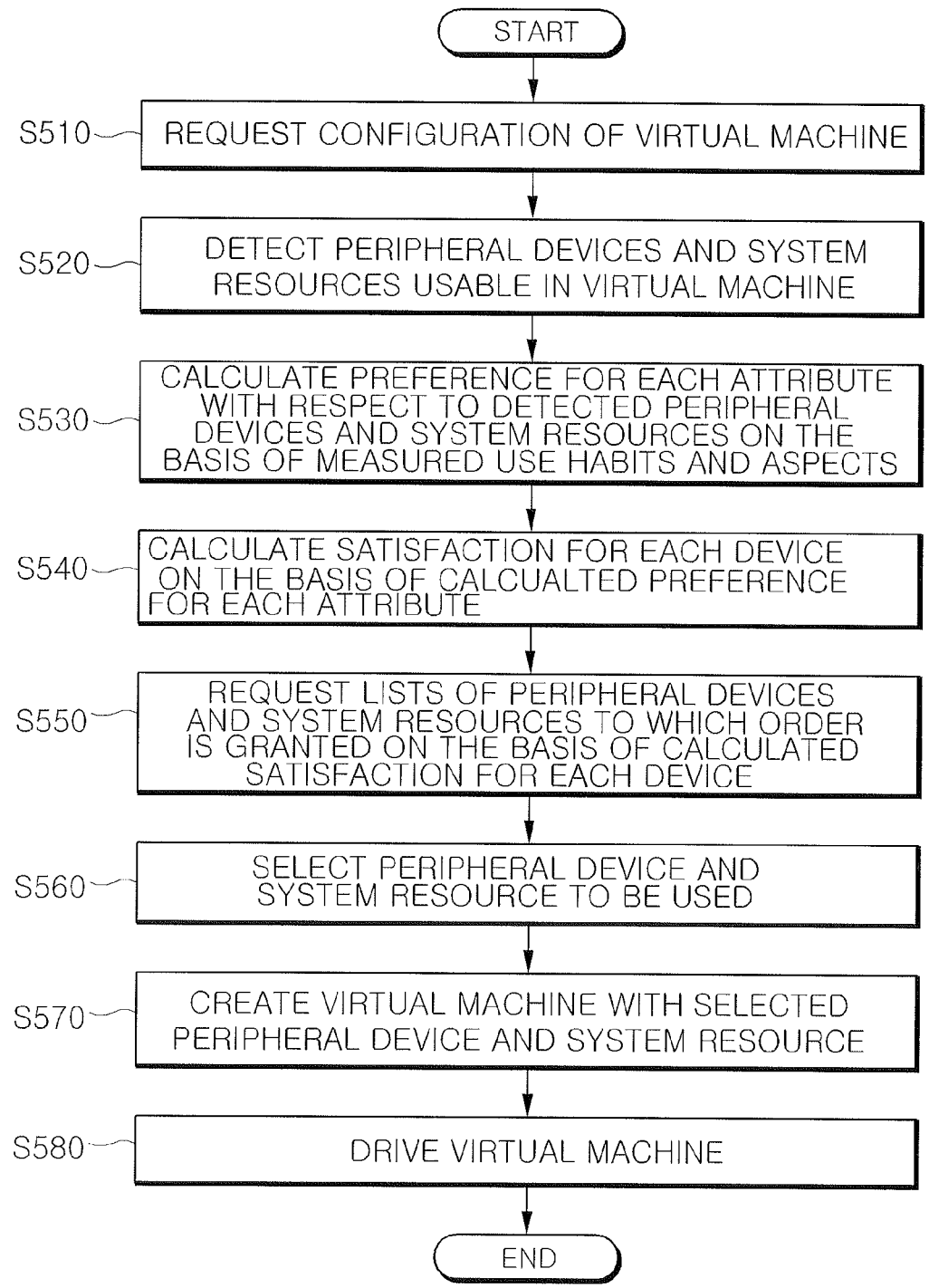
FIG. 6 is a flowchart for illustrating a step of creating virtual machines in a semiautomatic creation mode of FIG. 4.

FIG. 6 is a flowchart for illustrating a step of creating virtual machines in a semiautomatic creation mode of FIG. 4.

When the interface unit 310 receives the semiautomatic creation mode as the virtual machine creation mode from the user terminal 100, the interface unit 310 requests the configuration unit 350 to configure the virtual machine by the semiautomatic creation mode (S510).

When the configuration unit 350 receives the request for the configuration of the virtual machine by the semiautomatic creation mode from the interface unit 310, the configuration unit 350 requests the lists of the peripheral devices 200 and the system resources which can be used in the virtual machine to the management unit 320 (S520). The management unit 320 detects the peripheral device 200 and the system resource which can currently be used in the virtual machine among the plurality of peripheral devices 200 and the system resources on the detection request of the configuration unit 350 and transmits the detected peripheral device 200 and system resource to the configuration unit 350.

The configuration unit 350 requests a preference generating unit 340 to acquire preference for each attribute with respect to the peripheral device 200 and the system resource that are included in the lists of the peripheral devices 200 and the system resources which are received from the management unit 320 (S530). The preference generating unit 340 calculates the preference for each attribute with respect to the peripheral device 200 and the system resource on the request of the configuration unit 350 and transmits the calculated preference to the configuration unit 350.

The configuration unit 350 calculates satisfaction for each device with respect to the peripheral device 200 and the system resource on the basis of the preference for each attribute with respect to the peripheral device 200 and the system resource that are received from the preference generating unit 340 (S540). Herein, an example in which the configuration unit 350 calculates the satisfaction for device with respect to the keyboard will be described below. Attributes of the keyboard include an operation type and the number of keys. The operation type includes a mechanical type, a membrane type, and a rubber type. The number of keys includes 101, 103, and 106. Therefore, all the attributes of the keyboard and the preference for each attribute calculated by the preference generating unit 340 are shown in Table 1.

TABLE 1

| Attribute | Operation type | | | Number of keys | | |
|---|---|---|---|---|---|---|
| | Mechanical | Membrane | Rubber | 101 | 103 | 106 |
| Reference for each attribute | 0.9 | 0.1 | 0.3 | 0.8 | 0.5 | 0.1 |

At this time, in the configuration unit 350, when a keyboard having the following attribute is provided, satisfaction for each device, which is calculated by an inverse cosine law will be described below.

1) Attribute of keyboard 1={Mechanical, 101}

$$\text{Satisfaction for each device of keyboard } 1 = (0.9/\sqrt{0.9^2+0.1^2+0.3^2}+0.8/\sqrt{0.8^2+0.5^2+0.1^2})/2 = 0.893$$

2) Attribute of keyboard 2={Membrane, 101}

$$\text{Satisfaction for each device of keyboard } 2 = (0.1/\sqrt{0.9^2+0.1^2+0.3^2}+0.8/\sqrt{0.8^2+0.5^2+0.1^2})/2 = 0.474$$

3) Attribute of keyboard 3={Mechanical, 103}

$$\text{Satisfaction for each device of keyboard } 3 = (0.9/\sqrt{0.9^2+0.1^2+0.3^2}+0.5/\sqrt{0.8^2+0.5^2+0.1^2})/2 = 0.735$$

The configuration unit 350 provides the lists of the peripheral devices 200 and the system resources which are ordered on the basis of the calculated satisfaction for each device to the user terminal 100 (S550). That is, the configuration unit 350 provides the keyboard 1 having the highest satisfaction for each device as a first order, the keyboard 3 having intermediate satisfaction as a second order, and the keyboard 2 having the lowest satisfaction as a third order to the user terminal 100.

As the lists of the peripheral devices 200 and the system resources are received, the user selects the peripheral device 200 and the system resource to be used in the virtual machine among the lists of the peripheral devices 200 and the system resources by operating the user terminal 100 and transmits the selected peripheral device 200 and system resource to the interface unit 310 (S560).

The interface unit 310 requests the configuration unit 350 to create the virtual machine using the peripheral device 200 and the system resource that are received from the user terminal 100 and the configuration unit 350 creates the virtual machine constituted by the peripheral device 200 and the system resource that are selected by the user on the request of the interface unit 310 (S570).

The configuration unit 350 transmits the request for driving the peripheral device 200 and the system resource of the created virtual machine to the driving unit 360. The driving unit 360 drives the virtual machine by allocating the system resource constituting the virtual machine, and connecting and controlling the peripheral device 200 on the driving request of the configuration unit 350 to provide the virtual machine (S580).

FIG. 7 is a flowchart for illustrating a step of creating virtual machines in an automatic creation mode of FIG. 4.

When the interface unit 310 receives the automatic creation mode as the virtual machine creation mode from the user terminal 100, the interface unit 310 requests the configuration unit 350 to configure the virtual machine by the automatic creation mode (S710).

When the configuration unit 350 receives the request for the configuration of the virtual machine by the automatic creation mode from the interface unit 310, the configuration unit 350 requests the lists of the peripheral devices 200 and the system resources which can be used in the virtual machine to the management unit 320 (S720). The management unit 320 detects the peripheral device 200 and the system resource which can currently be used in the virtual machine among the plurality of peripheral devices 200 and the system resources on the detection request of the configuration unit 350 and transmits the detected peripheral device 200 and system resource to the configuration unit 350.

The configuration unit 350 requests the preference generating unit 340 to acquire preference for each attribute with respect to the peripheral device 200 an the system resource that are included in the lists of the peripheral devices 200 and the system resources which are received from the management unit 320 (S730). The preference generating unit 340 calculates the preference for each attribute with respect to the peripheral device 200 and the system resource on the request of the configuration unit 350 and transmits the calculated preference to the configuration unit 350.

The configuration unit 350 calculates satisfaction for each device with respect to the peripheral device 200 and the system resource on the basis of the preference for each attribute with respect to the peripheral device 200 and the system resource that are received from the preference generating unit 340 (S740). Herein, since a method of calculating the satisfaction for each device with respect to the peripheral device 200 and the system resource is the same as Step S540, a detailed description thereof will be omitted.

Next, the configuration unit 350 selects the peripheral device 200 and the system resource to be used in the virtual machine on the basis of the previously calculated satisfaction for each device with respect to the peripheral device 200 and the system resource (S750). For example, when the peripheral device 200 includes a plurality of keyboards and a plurality of mice and the configuration unit 350 calculates the satisfaction for each device with respect to each peripheral device 200 in the same manner as the method of calculating the satisfaction for each device, which is described in Step S540 as shown in Table 2, the configuration unit 350 selects the keyboard 1 and a mouse 3 which have the maximum satisfaction for each device among the plurality of keyboards and the plurality of mice as the constituent members of the virtual machine.

TABLE 2

| Classification | Keyboard | | | Mouse | | |
|---|---|---|---|---|---|---|
| | Keyboard 1 | Keyboard 2 | Keyboard 3 | Mouse 1 | Mouse 2 | Mouse 3 |
| Satisfaction | 0.893 | 0.474 | 0.735 | 0.543 | 0.853 | 0.933 |

The configuration unit 350 creates the virtual machine constituted by the peripheral device 200 and the system resource that are selected through Step S750 among the plurality of peripheral devices 200 and system resources (S760). That is, the configuration unit 350 creates the virtual machine constituted by the peripheral device 200 and the system resource that have the maximum satisfaction for each device among the plurality of peripheral devices 200 and system resources.

The configuration unit 350 transmits the request for driving the peripheral device 200 and the system resource of the created virtual machine to the driving unit 360. The driving unit 360 drives the virtual machine by allocating the system resource constituting the virtual machine, and connecting and controlling the peripheral device 200 on the driving request of the configuration unit 350 to provide the virtual machine (S770).

As described above, a system and a method for providing personalization of virtual machines in a SoD service can conveniently provide a virtual machine suitable for user's requirements without user's directly designating complicated constituent members of the virtual machines of the SoD system by calculating preference for each attribute by measuring and collecting user's virtual machine use habits and aspects and providing a virtual machine constituted by peripheral devices 200 and system resources that are required for a user on the basis of the calculated preference.

Further, the system and the method for providing personalization of virtual machines in a SoD service can use more optimized peripheral devices 200 and system resources for the SoD service by creating and providing the virtual machine with only peripheral devices 200 and system resources required for a user.

In the embodiment, although the virtual machine creation mode is inputted from a user terminal 100, the virtual machine is created through a manual creation mode in an early stage in which preference for each attribute is not grasped and the virtual machine can be created in the order of a semiautomatic creation mode and an automatic creation mode when satisfaction for each device, which is calculated on the basis of the preference for each attribute, reaches at a predetermined level or more after the preference for each attribute is sufficiently grasped. Further, in this case, a step of receiving the virtual machine creation mode from the user terminal 100 may be omitted.

In addition, for convenience of description, although an interface unit 310, a management unit 320, an aspect measuring unit 330, a preference generating unit 340, a configuration unit 350, and a driving unit 360 are included in an SoD server 300, each unit is configured as a separate server and may perform a corresponding function.

Although preferred embodiments of the present invention have been described, it will be appreciated by those skilled in the art that various modifications and changes may be made without departing from the appended claims of the present invention.

What is claimed is:

1. A system for providing personalization of virtual machines for a System on Demand (SoD) service, which the system is connected to a plurality of user terminals and a plurality of peripheral devices, comprising:
    an SoD server,
    wherein the SoD server comprises,
    an aspect measuring unit that measures user's use habits and aspects with respect to the peripheral devices at a predetermined set time interval, which is configured based on use and not use of each of the peripheral devices, and
    wherein the aspect is configured based on measuring at least one or more of frequency, time, and duration of the use and the not use of each of the respected peripheral devices;
    a preference generating unit that calculates preference for each of at least two or more different type of characteristics with respect to each of the attributes comprised in the peripheral devices, which is based on the use habits and the aspects measured by the aspect measuring unit; and
    a configuration unit is configured to calculate satisfaction for each of the at least two or more different type of characteristics with respect to each of the attributes with respect to peripheral devices which are available for use in the virtual machine and which is based on the preference for at least the two or more different type of characteristics with respect to each of the attributes calculated by the preference generating unit and configures the peripheral devices of the virtual machine based on the calculated satisfaction for each of the available peripheral devices, and
    wherein the calculated satisfaction is configured from at least one of a manual creation mode, an automatic creation mode, and any combination thereof from the user terminal,
    wherein when the manual creation mode is configured to be generated, the user creates the virtual machine by designating at least one or more of the respected peripheral devices from the available peripheral devices,
    wherein when the automatic creation mode is configured to be generated, the SoD automatically creates the virtual machine by generating at least one or more of the respected peripheral devices from the available peripheral devices, which is done without the user selection any the available peripheral devices, and
    wherein each of the attributes having a higher amount of the aspect increases these respective attributes having the higher amount of aspect as the respective attribute chosen from the plurality of attributes for the virtual machine.

2. The system for providing personalization of virtual machines for a SoD service according to claim 1, wherein the preference generating unit calculates the preference for the at least two or more different type of characteristics with respect to each of the attributes by using the use habits and the aspects measured by the aspect measuring unit at a predetermined set time interval.

3. The system for providing personalization of virtual machines for a SoD service according to claim 1, wherein the preference generating unit calculates the preference for the at least two or more different type of characteristics with respect to each of the attributes by using the use habits and the aspects accumulated and stored in the aspect measuring unit.

4. The system for providing personalization of virtual machines for a SoD service according to claim 1, wherein the configuration unit configures the virtual machine by using the peripheral device selected by the user terminal among the peripheral devices available for use in the virtual machine.

5. The system for providing personalization of virtual machines for a SoD service according to claim 1, wherein the configuration unit configures the virtual machine by using the peripheral device having a highest satisfaction for the at least two or more different type of characteristics with respect to each of the attributes among the peripheral devices available for use in the virtual machine.

6. The system for providing personalization of virtual machines for a SoD service according to claim 1, wherein the SoD server further comprises a management unit that detects the peripheral device available for use in the virtual machine among the plurality of peripheral devices and transmits the detected peripheral device to the configuration unit and detects and transmits at least one of the use or the not use of the peripheral device to the aspect measuring unit.

7. The system for providing personalization of virtual machines for a SoD service according to claim 1, wherein the SoD server further comprises an interface unit that receives one of virtual machine creation modes comprising at least one of the manual creation mode, the automatic creation mode, and any of the combination thereof from the user terminal.

8. The system for providing personalization of virtual machines for a SoD service according to claim 7, wherein the interface unit transmits a list of the peripheral devices which are available for use in the virtual machine to the user terminal when the manual creation mode is inputted.

9. The system for providing personalization of virtual machines for a SoD service according to claim 7, wherein the interface unit transmits the list of the peripheral devices which are available for use in the virtual machine to the user terminal, which are put in sequential ordered based on the satisfaction for each of the peripheral devices calculated by the configuration unit when the combination of the manual creation mode and the automatic creation mode is inputted.

10. The system for providing personalization of virtual machines for a SoD service according to claim 1, wherein the SoD server further comprises a driving unit that connects and controls the peripheral devices of the virtual machines configured by the configuration unit.

11. A method for providing personalization of virtual machines for a System on Demand (SoD) service, the method comprising:
having a network connected between a plurality of user terminals and a plurality of peripheral devices,
allowing an aspect measuring unit to measures user's use habits and aspects with respect to the peripheral devices at a predetermined set time interval, which is based on use or not use of each of the peripheral devices, and
wherein the aspect is based on measuring at least one or more of frequency, time, and duration of the use and the not use of each of the respected peripheral devices;
allowing a preference generating unit to calculate preference for each of at least two or more different type of characteristics with respect to each of the attributes comprised in the peripheral devices, which is based on the use habits and the aspects measured by the aspect measuring unit;
allowing a configuration unit to calculate satisfaction for each of the at least two or more different type of characteristics with respect to each of the attributes with respect to peripheral devices are available for use in the virtual machine and which is based on the preference for at least the two or more different type of characteristics with respect to each of the attributes calculated by the preference generating unit; and
allowing the configuration unit to configure the peripheral devices of the virtual machine based on the calculated satisfaction for each of the available peripheral devices, and
wherein the calculated satisfaction is based on at least one of a manual creation mode, an automatic creation mode, and any combination thereof from the user terminal,
wherein when the manual creation mode is configured to be generated, the user creates the virtual machine by designating at least one or more of the respected peripheral devices from the available peripheral devices,
wherein when the automatic creation mode is generated, the SoD automatically creates the virtual machine by generating at least one or more of the respected peripheral devices from the available peripheral devices, which is done without the user selecting any of the available peripheral devices.

12. The method according to claim 11, wherein in calculating the preference, the preference generating unit calculates the preference for the at least two or more different type of characteristics with respect to each of the attributes by using the use habits and the aspects measured by the aspect measuring unit at a predetermined set time interval.

13. The method according to claim 11, wherein in calculating the preference, the preference generating unit calculates the preference for the at least two or more different type of characteristics with respect to each of the attributes by using the use habits and the aspects accumulated and stored in measuring the user's use habits and aspects.

14. The method according to claim 11, wherein in the configuring the peripheral devices, the configuration unit configures the virtual machine by using the peripheral device selected by the user terminal among the peripheral devices available for use in the virtual machine.

15. The method according to claim 11, wherein in the configuring the peripheral devices, the configuration unit configures the virtual machine by using the peripheral device having a highest satisfaction for the at least two or more different type of characteristics with respect to each of the attributes among the peripheral devices available for use in the virtual machine.

16. The method according to claim 11, further comprising:
allowing a management unit to detect the peripheral device available for use in the virtual machine among a plurality of peripheral devices; and
allowing the management unit to detect at least one of the use or the not use of the peripheral device constituting the virtual machine.

17. The method according to claim 11, further comprising:
allowing an interface unit to receive any one of virtual machine creation modes comprising at least one of the manual creation mode, the automatic creation mode, and any of the combination thereof from the user terminal.

18. The method according to claim 17, wherein in inputting any one virtual machine creation mode, when the manual creation mode is inputted, the interface unit transmits a list of the peripheral devices which are available for use in the virtual machine to the user terminal.

19. The method according to claim 17, wherein in inputting any one virtual machine creation mode, the interface unit transmits the list of the peripheral devices which are available for use in the virtual machine, which are put in sequential ordered based on the satisfaction for each of the peripheral devices calculated in calculating the satisfaction to the user terminal when the the combination of the manual creation mode and the automatic creation mode is inputted.

20. The method according to claim 11, further comprising:
allowing a driving unit to connect and control the peripheral devices of the virtual machines configured by the configuration unit.

* * * * *